(12) United States Patent
Knecht et al.

(10) Patent No.: US 12,451,775 B2
(45) Date of Patent: Oct. 21, 2025

(54) ROTOR DEVICE FOR AN ELECTRIC MACHINE, AND IN PARTICULAR FOR A TRACTION DRIVE OF A MOTOR VEHICLE, AS WELL AS A METHOD FOR MANUFACTURING A ROTOR DEVICE

(71) Applicant: Dr. Ing. h.c. F. Porsche Aktiengesellschaft, Stuttgart (DE)

(72) Inventors: Patrick Knecht, Stuttgart (DE); Peter Wurster, Wiggensbach (DE); Tobias Engelhardt, Stuttgart (DE); Johannes Lange, Dettenheim (DE); Florian Braunbeck, Bietigheim-Bissingen (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 343 days.

(21) Appl. No.: 18/209,523

(22) Filed: Jun. 14, 2023

(65) Prior Publication Data

US 2024/0022146 A1    Jan. 18, 2024

(30) Foreign Application Priority Data

Jul. 14, 2022    (DE) .................... 10 2022 117 562.6

(51) Int. Cl.
*H02K 7/00* (2006.01)
*H02K 1/28* (2006.01)
*H02K 15/03* (2006.01)

(52) U.S. Cl.
CPC ............... *H02K 15/03* (2013.01); *H02K 1/28* (2013.01); *H02K 7/003* (2013.01)

(58) Field of Classification Search
CPC ............ H02K 1/28; H02K 1/30; H02K 7/003; H02K 15/14; H02K 15/144
See application file for complete search history.

(56) References Cited

U.S. PATENT DOCUMENTS

2016/0079832 A1* 3/2016 Schneider ............... H02K 15/03
29/598
2017/0271945 A1* 9/2017 Germann ............... F04D 25/062
(Continued)

FOREIGN PATENT DOCUMENTS

WO    WO-2023057009 A1 *  4/2023  ............ H02K 1/30

OTHER PUBLICATIONS

WO-2023057009-A1—Machine Translation (Year: 2023).*

*Primary Examiner* — Oluseye Iwarere
*Assistant Examiner* — Masoud Vaziri
(74) *Attorney, Agent, or Firm* — Gerald E. Hespos; Michael J. Porco

(57) ABSTRACT

A rotor device (1) for an electric machine (10) has a rotatably supported shaft (2) and a rotor hub (3) connected to the shaft (2) in a rotationally fixed manner. The shaft (2) has multiple radially outwardly facing shaft protrusions (12), and the rotor hub (3) has multiple radially inwardly facing hub protrusions (13). A shaft protrusion (12) and a respective hub protrusion (13) abut one another in a touching manner in the radial direction at least in sections. Cavities (4) are formed between the rotor hub (3) and the shaft (2). The cavities (4) extend between adjacent shaft protrusions (12) and the hub protrusions (13) lying thereon. The cavities (4) are grouted with a material (14). The material (14) forms form-fit elements (24) that block relative movement of the rotor hub (3) and the shaft (2) in a form-fit manner.

11 Claims, 2 Drawing Sheets

(56) References Cited

U.S. PATENT DOCUMENTS

2019/0027985 A1* 1/2019 Widmer .................. H02K 1/28
2019/0140504 A1* 5/2019 Maier ................... H02K 15/03
2019/0372425 A1* 12/2019 Tschida .................. H02K 5/00

* cited by examiner

ROTOR DEVICE FOR AN ELECTRIC MACHINE, AND IN PARTICULAR FOR A TRACTION DRIVE OF A MOTOR VEHICLE, AS WELL AS A METHOD FOR MANUFACTURING A ROTOR DEVICE

CROSS REFERENCE TO RELATED APPLICATION

This application claims priority on German Patent Application No 10 2022 117 562.6 filed Jul. 14, 2022, the entire disclosure of which is incorporated herein by reference.

BACKGROUND

Field of the Invention

The invention relates to a rotor device for an electric machine and a method for manufacturing such a rotor device. The rotor device has a rotatably mounted shaft and at least one rotor hub connected to the shaft in a rotationally fixed manner.

Related Art

The connection between the rotor hub and shaft of an electric machine is critical for torque to be transferred with the shaft. For example, the rotor hub and shaft of a modern electric vehicle traction drive are connected by a radial force fit (e.g. hot-cold connection), an axial force fit (e.g. clamping nut) or a form fit, such as a hexagonal outer contour. A combination of a force fit and a form fit also is used sometimes. For example, a cam shaft or flat tab is used on the rotor hub. Such embodiments regularly lead to undesirable digging in. A form fit with geometric overlapping of the components can also be provided as a supplementary feature, e.g. in the hot-cold connection.

Known connections between the rotor hub and shaft of an electric machine often are expensive and are limited in terms of the desired torque transmission at high speeds, such as speeds that occur with high-performance traction drives for sports vehicles or race cars. Thus, improved connections between the rotor hub and shaft of an electric machine would be well-received.

Accordingly, an object of the invention is to provide an improved connection of the shaft to the rotor hub of an electric machine for reliably transferring large torques in combination with higher speeds. A further object is to provide such a connection that can be manufactured inexpensively and with industrial efficiency.

SUMMARY OF THE INVENTION

The invention relates to a rotor device for an electric machine, and, in particular, for an electric traction drive of a motor vehicle. The rotor device comprises a rotatably mounted shaft and at least one rotor hub connected to the shaft in a rotationally fixed manner. The shaft comprises multiple shaft protrusions facing radially outward toward the rotor hub, and the rotor hub comprises multiple hub protrusions facing radially inward toward the shaft. At least one shaft protrusion and at least one hub protrusion abut one another in a touching manner in the radial direction at least in sections. Cavities are formed between the rotor hub and the shaft. The cavities extend between adjacent shaft protrusions and the hub protrusions lying thereon. The cavities are filled with at least one cast material that hardens to define form-fit elements. The form-fit elements block relative movement of the rotor hub and shaft in a form-fit manner.

The invention offers many advantages. For example, the form-fit elements can be manufactured simply and reliably in the cavities and provide a very resilient form-fit connection between the rotor hub and the shaft. In addition, form-fit elements manufactured in this way are suited well for supporting an already existing joining connection between the shaft and the rotor hub. Furthermore, this configuration prevents digging in and provides independence from sheet metal packaging.

The hub protrusions and shaft protrusions that abut one another in a touching manner provide an effective thermal binding of the rotor and, for example, a sheet metal package to the rotor shaft. This can significantly improve the cooling effect of a rotor shaft perfused by coolant. The reliable connection and the targeted thermal binding are well-suited for use in high-performance traction drives at very high speeds or torques.

The form-fit elements respectively abut adjacent shaft protrusions and the hub protrusions lying thereon (in the circumferential direction) in a form-fit manner. Thus, the rotational movement can be blocked reliably.

The form-fit elements abut respective sides of the shaft protrusions facing in the circumferential direction and sides of the hub protrusions facing in the circumferential direction. These sides limit the cavities in the circumferential direction.

As a result of such configurations, the form fit can only be suspended when the form-fit element would shear or break in at least two parts. The form-fit element can still block the relative movement even if it were to be lying "loosely" in the cavity. The effect of the form-fit element is independent of its adhesion to the shaft and the rotor.

The form-fit elements may be shaped originally in the cavities. In particular, the form-fit elements are manufactured by a casting process using the cavity of the rotor apparatus as a shaping tool, thereby allowing for a fast and uncomplicated connection between the rotor hub and the shaft. Due to the original shaping in the cavities, the form-fit elements can be formed in a targeted manner virtually independently of accuracies and tolerances between the rotor hub and the shaft.

The casting process may be an injection molding process or a transfer molding. The form-fit elements may originally be shaped in the cavities under pressurization and preferably at a pressure of at least 100 bar. In particular, the cavities are filled with at least one solid (or hardened) material. The material may be plastic, but other materials suitable for this purpose are also possible.

The shaft protrusion and the hub protrusion may only touch at their radial front faces. In particular, the rotor hub and the shaft only touch where the shaft protrusion and the hub protrusion touch. This allows for an inexpensive manufacturing and joining of the rotor hub and shaft while ensuring a very resilient connection in combination with the form-fit elements. In particular, the shaft protrusion and the hub protrusion do not contact outside the front faces, and specifically the shaft protrusion and the hub protrusion do not touch on their sides facing in the circumferential direction. It is possible that the front faces of the shaft protrusions and/or the hub protrusions are at least partially leveled.

The shaft protrusion and the hub protrusion may be joined together at least in a form-fit manner. More particularly, the shaft protrusion and the hub protrusion are pressed and/or shrunk. The shrinkage is a hot-cold connection. In particular, the shaft protrusion and the hub protrusion are joined only on their radial front sides.

A force-fit connection, in particular a press fit, is formed and/or a hot-cold connection is formed between the shaft protrusions and the hub protrusions lying thereon. In particular, the shaft protrusions are joined with the hub protrusions lying thereon at the radial front side in the press-fit connection. Other suitable joining types are also possible.

The shaft protrusion and the hub protrusion also can be joined in a form-fit manner. Such a form fit can be provided in that the shaft protrudes into the minimum inner circumference of the rotor hub with its maximum outer circumference. For example, the shaft or the rotor hub can have a polygonal outer contour. The shaft protrusions or hub protrusions then are provided by the leveled regions between the edges of the polygonal outer contour. The edges of the polygonal outer contour then protrude into the cavities.

The shaft protrusion and the hub protrusion may be joined only in a force-fit manner. Thus, the shaft, with its maximum outer circumference, does not protrude into the minimum inner circumference of the rotor hub. In particular, the shaft protrusion and the hub protrusion may not abut one another in the circumferential direction.

The rotor apparatus can comprise magnetic units. In particular, the magnetic units are embedded at least partially in the rotor, such as in receiving spaces. The magnetic units may be fixed to the rotor or in the receiving spaces by a cast fixation structure. The fixation structure and the form-fit elements may be made of the same material. In particular, the magnetic units are housed in receiving spaces that are grouted with the material along with the cavities. The fixation structure and the form-fit elements are shaped simultaneously. In particular, the fixation structure may be manufactured by an injection molding process or a transfer molding. However, it is also possible that the fixation structure is manufactured independently of the form-fit elements.

The method of the invention functions to manufacture a rotor device for an electric machine, such as a traction drive of a motor vehicle. The rotor device comprises a rotatably mounted shaft and at least one rotor hub connected to the shaft in a rotationally fixed manner. The shaft comprises multiple shaft protrusions facing radially outward toward the rotor hub. The rotor hub comprises multiple hub protrusions facing radially inward toward the shaft. The method comprises at least the following method steps in this or another feasible sequence: joining the shaft protrusions with a hub protrusion such that at least one shaft protrusion and at least one hub protrusion abut one another in a touching manner in the radial direction at least in sections. As a result, cavities are formed between adjacent shaft protrusions and the hub protrusions lying thereon. Original shaping of form-fit elements is achieved by introducing at least one formless material into the cavities and hardening the material. In particular, the form-fit elements block a relative movement of the rotor hub and shaft in a form-fit manner.

The method comprises manufacturing the above-described rotor device. In particular, the rotor device is configured to be manufactured by the method presented here. The method can be used to solve the previously posed problem in a particularly advantageous manner.

The original shaping of the form-fit elements and an original shaping of a fixation structure for magnetic units are carried out in a common process and preferably simultaneously and/or in a common casting tool. This provides a further simplification of the manufacturing process. The fixation structure preferably is configured as previously described. In particular, the form-fit elements and the fixation structure may be manufactured simultaneously by injection molding or injection pressing or another suitable method. In particular, the material is introduced into receiving spaces that are formed on the rotor and house the magnetic units. The apparatus that introduces the material into the receiving spaces also may introduce the material into the cavities.

The joining of the shaft protrusions with the hub protrusions may occur by pressing and/or shrinking (warm-cold process). In particular, at least one force-fit joining is provided. In addition or alternatively, a form-fit joining can also be provided.

The introduction of the material into the cavities may take place at a pressure of at least 100 bar, or also at least 200 bar, or more. In particular, the material for manufacturing the fixation structure also may be introduced into the rotor at such a pressure. Such pressure is provided in injection molding or injection pressing.

The pressure is designed so that the joining connections between shaft protrusions and hub protrusions are biased in a defined manner. In particular, a press fit between the rotor hub and the shaft undergoes a defined biasing by the introduction of the material under pressure.

The same number of shaft protrusions and hub protrusions is provided. In particular, the shaft protrusions and the hub protrusions are joined in abutting pairs. At least four pairs are provided, respectively. For example, an advantageous number for traction drives is between eight and twelve pairs. In particular, the hub protrusions and the shaft protrusions are arranged symmetrically about the circumference of the rotor hub and the shaft.

The connection of the shaft protrusions to the hub protrusions may be supplemented by the form-fit elements. In the context of this invention, the shaft protrusions or the hub protrusions can also be provided by leveled portions on a radially outer side of the shaft or the rotor hub. In particular, the shaft protrusions define a maximum outer circumference of the shaft, and the hub protrusions define a minimum inner circumference of the rotor hub.

The cavities of some embodiments are formed between adjacent shaft protrusions and the hub protrusions lying thereon. In particular, the rotor hub is connected to or formed on a sheet metal packet and/or a balancing disk of the rotor. The form fit relates to the circumferential direction of the components or to the rotational direction of the rotor device. The form-fit does not refer to the axial direction.

Further advantages and features of the invention are described below with reference to the accompanying drawings.

DETAILED DESCRIPTION

Figure 1:
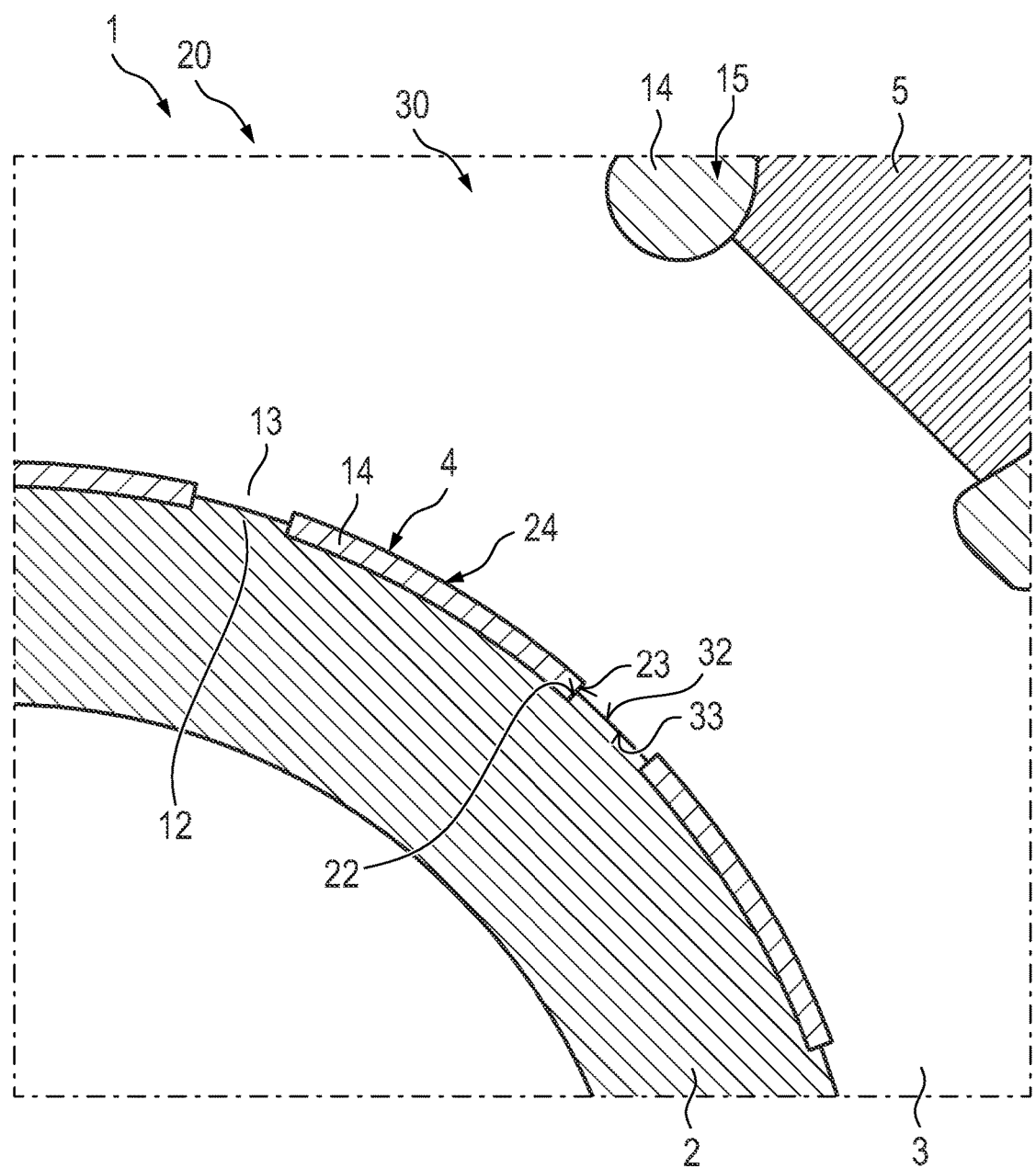
FIG. 1 is a cross-section of a rotor device according to the invention.

FIG. 1 is a cross-sectional view of a rotor device 1 for an electric machine 10 of a traction drive 20 of an electric vehicle. The rotor device 1 comprises a rotor 30 having a rotor hub 3 that is connected to a shaft 2 in a rotationally fixed manner.

The shaft 2 is supported rotatably on a housing of the machine 10, not shown. The rotor 30 is supported rotatably via the shaft 2 in a stator of the machine 10. The rotor hub 3 also can be connected in a rotationally fixed manner to a balancing disk, not shown. For example, the rotor 30 comprises or is configured as a sheet package.

The rotor hub 3 comprises hub protrusions 13 facing radially inward toward the shaft 2. The shaft 2 comprises shaft protrusions 12 facing radially outward toward the rotor hub 3. The hub protrusions 13 have radial front faces 33 that abut on radial front faces 32 of the shaft protrusions 12.

The shaft protrusions 12 and the hub protrusions 13 extend over the entire axial length of the shaft 2 and the rotor hub 3. The shaft protrusions 12 and hub protrusions 13 are distributed symmetrically over the circumference, and, for example, 8 to 12 shaft protrusions 12 and hub protrusions 13 are provided.

Cavities 4 are formed between the rotor hub 3 and the shaft 2. The cavities 4 extend between the adjacent shaft protrusions 12 and the hub protrusions 13 lying thereon. The cavities 4 are cast with a material 14 that hardens to define form-fit elements 24 that block relative movement of the rotor hub 3 and shaft 2 in a form-fit manner. The form-fit elements 24 abut the sides 22 of the shaft protrusions 12 facing in the circumferential direction and the sides 23 of the hub protrusions 13 facing in the circumferential direction.

Receiving spaces are configured in the rotor 30 and receive magnetic units 5. The magnetic units 5 are held fixedly in the receiving spaces via a fixation structure 15. The fixation structure 15 and the form-fit elements 24 are manufactured simultaneously in a common process and consist of the same material 14.

Figure 2:
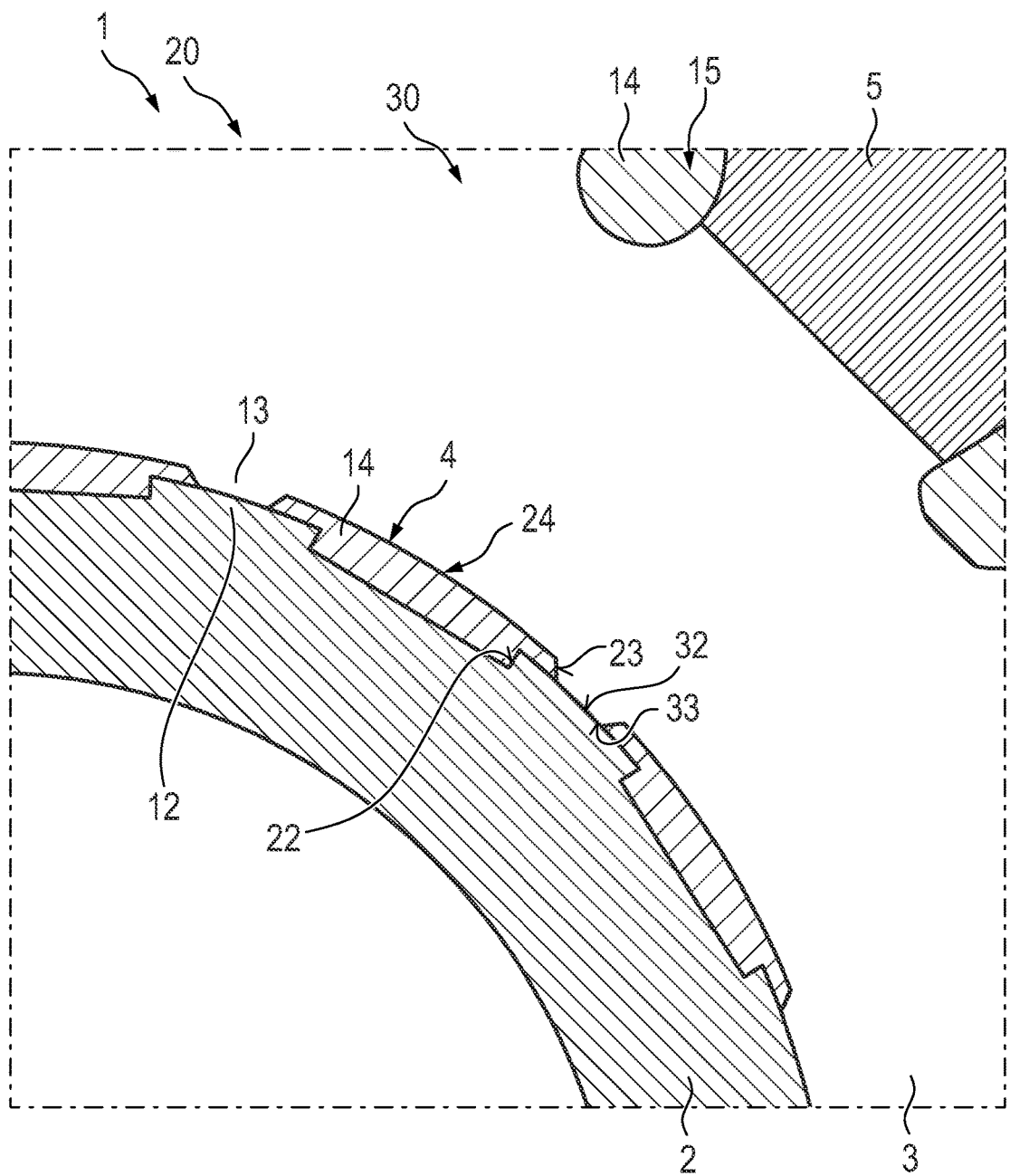
FIG. 2 is a further cross-section of an alternate rotor device of the invention.

FIG. 2 shows an alternate embodiment of the rotor device 1 of FIG. 1. The front faces 33 of the hub protrusions 13 are narrower than the front faces 32 of the shaft protrusions 12.

As part of the manufacture of the rotor device 1, the rotor hub 3 is placed on the shaft 2 such that the hub protrusions 13 rest on a respective shaft protrusion 12. The joining is carried out under high force and by means of pressing or shrinking, for example, so that a force-fit connection between shaft 2 and rotor hub 3 is established. The rotor hub 3 and the shaft 2 only touch one another on the shaft protrusions 12 and hub protrusions 13 such that the cavities 4 are formed between them.

The cavities 4 subsequently are filled with a material 14 and for example a suitable plastic. Various methods, such as injection molding or transfer molding, can be used for the filling. The filling preferably is carried out under high pressure of at least 100 bar or more.

Due to the filling, the form-fit elements 24 originally are shaped in the cavities 4. After the hardening of the material 14, the form-fit elements 24 block relative movement. In the same process and preferably in the same tool, the material 14 then is introduced into the receiving spaces for the magnetic units 5. Thus, the process of magnetic fixation is used to manufacture the form-fit elements 24. However, a separate process is also possible.

By filling in the cavities 4, the carrying capacity is significantly increased in terms of the maximum possible torque transmission of the shaft-hub connection. Thus, during the filling, the press fit experiences a considerable biasing due to the high pressure. In addition, the form-fit elements 24 manufactured in the cavities 4 counteract a relative movement of the rotor hub 3 and shaft 2, because an adhesive connection is achieved between these two joining partners and the material 14. In addition (even without the adhesive connection), a shearing or breakage of the form-fit elements 24 would be required to suspend the form-fit connection of the rotor hub 3 and shaft 2. For this purpose, the breaking line here would have to run through the form-fit elements 24 approximately centrally and in the circumferential direction.

The invention allows for the introduction of additionally supporting form-fit elements 24 in the region of the shaft-hub connection (for example, of the shaft 2 to sheet metal packets and balancing disks) by means of original shaping processes (for example injection molding, transfer molding). In addition, this significantly increases the thermal binding of the rotor 30 and the rotor hub 3 to the shaft 2. In addition, the invention has the advantage that the manufacture and positioning of the form-fit elements 24 within the rotor 30 can be integrated into the process of magnetic fixation.

The invention claimed is:

1. A rotor device (1) for an electric machine (10), comprising a rotatably supported shaft (2) and at least one rotor hub (3) connected to the shaft (2) in a rotationally fixed manner, the shaft (2) having multiple radially outwardly facing shaft protrusions (12), and the rotor hub (3) having multiple radially inwardly facing hub protrusions (13), at least one shaft protrusion (12) and at least one hub protrusion (13) respectively contacting one another in a touching manner in a radial direction at least in sections, and cavities (4) are formed between the rotor hub (3) and the shaft (2), the cavities (4) respectively extending between adjacent shaft protrusions (12) and the adjacent hub protrusions (13), and the cavities (4) are grouted with at least one material (14) that forms form-fit elements (24) that block a relative movement of the rotor hub (3) and the shaft (2) in a form-fit manner.

2. The rotor device (1) of claim 1, wherein the form-fit elements (24) respectively abut adjacent shaft protrusions (12) and the hub protrusions (13) lying thereon.

3. The rotor device (1) of claim 2, wherein the form-fit elements (24) respectively abut at least sides (22, 23) of the shaft protrusions (12) and the hub protrusions (13) facing in a circumferential direction.

4. The rotor device (1) of claim 1, wherein the form-fit elements (24) are originally shaped in the cavities (4).

5. The rotor device (1) of claim 1, wherein the shaft protrusion (12) and the hub protrusion (13) only touch at their radial front faces (32, 33).

6. The rotor device (1) of claim 1, wherein the shaft protrusion (12) and the hub protrusion (13) are joined at least in a force-fit manner and are pressed and/or shrunk onto one another.

7. The rotor device (1) of claim 1, comprising magnetic units (5) at least partially embedded in the rotor (30) and fixed to the rotor by a cast fixation structure (15), and wherein the fixation structure (15) and the form-fit elements (24) are made of the same material (14).

8. A method for manufacturing a rotor device (1) for a traction drive (20) of a motor vehicle, the rotor device (1) having a rotatably supported shaft (2) and at least one rotor hub (3) connected to the shaft (2) in a rotationally fixed manner, the shaft (2) having radially outwardly facing shaft protrusions (12), and the rotor hub (3) having radially inwardly facing hub protrusions (13), the method comprising:

joining of the shaft protrusions (12) with a respective hub protrusion (13), so that at least one shaft protrusion (12) and at least one hub protrusion (13) respectively abut one another in a touching manner in the radial direction at least in sections, and so that cavities (4) are formed between adjacent shaft protrusions (12) and the hub protrusions (13) lying thereon;

shaping form-fit elements (24) that block a relative movement of the rotor hub (3) and shaft (2) in a form-fit manner, by introducing at least one formless material (14) into the cavities (4) and hardening the material (14).

9. The method of claim 8, wherein the shaping of the form-fit elements (24) and shaping of a fixation structure (15) for fixing magnetic units (5) to the rotor (30) occur simultaneously in a common casting tool.

10. The method of claim 8, wherein the joining of the shaft protrusions (12) with the hub protrusions (13) occurs by pressing and/or shrinking.

11. The method of claim 8, wherein the introduction of the material (14) into the cavities (4) is carried out at a pressure of at least 100 bar.

* * * * *